United States Patent [19]
Pevler

[11] Patent Number: 5,856,803
[45] Date of Patent: Jan. 5, 1999

[54] METHOD AND APPARATUS FOR DETECTING RADIO-FREQUENCY WEAPON USE

[76] Inventor: A. Edwin Pevler, 2716 Monet Pl., Dallas, Tex. 75287

[21] Appl. No.: 690,266

[22] Filed: Jul. 24, 1996

[51] Int. Cl.[6] .................................. G01S 7/40; G01S 7/41
[52] U.S. Cl. ............................. 342/13; 342/90; 342/192; 324/76.14; 324/606; 324/605; 455/227; 340/657; 340/659
[58] Field of Search ............................. 324/76.13, 76.14, 324/605, 606, 608; 455/227, 228; 342/13, 90, 192, 193; 340/539, 657, 658, 659

[56] References Cited

U.S. PATENT DOCUMENTS

| | | | |
|---|---|---|---|
| 3,662,316 | 5/1972 | Robbins | 375/256 |
| 3,783,448 | 1/1974 | Brodwin | 342/351 |
| 3,900,848 | 8/1975 | Mears | 342/95 |
| 4,074,264 | 2/1978 | Wilmonti | 342/90 |
| 4,217,580 | 8/1980 | Lowenschuss | 342/13 |
| 4,315,261 | 2/1982 | Mosher | 455/227 X |
| 4,390,838 | 6/1983 | Savage | 324/76.31 |
| 4,700,191 | 10/1987 | Manor | 342/13 |
| 4,721,924 | 1/1988 | Masdea et al. | 331/1 R |
| 4,728,958 | 3/1988 | Choate | 342/424 |
| 4,756,866 | 7/1988 | Alvarez | 376/157 |
| 4,757,253 | 7/1988 | Weber et al. | 324/76.31 |
| 4,792,806 | 12/1988 | Bent et al. | 342/465 |
| 4,825,149 | 4/1989 | Voss et al. | 324/72 |
| 4,851,854 | 7/1989 | Drogin | 342/417 |
| 4,876,551 | 10/1989 | Climent et al. | 342/460 |
| 4,885,586 | 12/1989 | Hoover et al. | 342/13 |
| 4,928,105 | 5/1990 | Langner | 342/192 |
| 4,933,668 | 6/1990 | Oyer et al. | 340/541 |
| 4,967,667 | 11/1990 | Horwath | 102/494 |
| 4,983,983 | 1/1991 | Huntley et al. | 342/443 |
| 4,992,797 | 2/1991 | Gjessing et al. | 342/192 |
| 5,010,341 | 4/1991 | Huntley et al. | 342/20 |
| 5,063,371 | 11/1991 | Oyer et al. | 340/541 |
| 5,168,224 | 12/1992 | Maruizumi et al. | 324/300 |
| 5,305,007 | 4/1994 | Orr et al. | 342/20 |
| 5,325,299 | 6/1994 | Moses et al. | 364/420 |
| 5,392,050 | 2/1995 | Guerci et al. | 342/90 |
| 5,400,261 | 3/1995 | Reynolds | 364/487 |
| 5,455,586 | 10/1995 | Barbier et al. | 342/37 |
| 5,459,451 | 10/1995 | Crossfield et al. | 340/572 |
| 5,461,383 | 10/1995 | Ono et al. | 342/20 |
| 5,530,429 | 6/1996 | Hablov et al. | 340/552 |
| 5,541,520 | 7/1996 | Zai et al. | 324/618 |
| 5,543,779 | 8/1996 | Aspesi et al. | 340/539 |
| 5,561,364 | 10/1996 | Skudera, Jr. | 324/76.23 |

*Primary Examiner*—John B. Sotomayor
*Attorney, Agent, or Firm*—Needle & Rosenberg, P.C.

[57] ABSTRACT

An apparatus for detecting abnormal radio-frequency signals has an antenna responsive to a radio-frequency signal. The radio frequency signal has a plurality of signal components, each of which has an associated amplitude. A circuit attenuates each of the plurality of signal components having an amplitude not greater than a threshold value and generates a suspect signal comprising each of the plurality of signal components having an amplitude greater than the threshold value. A circuit then compares the suspect signal to a plurality of preselected signal types. When the suspect signal does not correspond to any of the preselected signal types, a circuit generates an alarm. In a method of detecting usage of a radio-frequency weapon, a signal having an amplitude, is received. A background signal amplitude of a plurality of components of the signal is determined. The signal is filtered to generate a filtered signal corresponding only to signal components of the plurality of signal components having amplitudes greater than a preselected margin greater than the amplitude of the background signal. The filtered signal is compared to a plurality of known signals. When the filtered signal does not correspond to any of the plurality of known signals, an alarm is generated.

18 Claims, 5 Drawing Sheets

METHOD AND APPARATUS FOR DETECTING RADIO-FREQUENCY WEAPON USE

BACKGROUND OF THE INVENTION

1. Field of the Invention

The present invention relates to electronic countermeasures and, more specifically, to devices used to detect harmful electromagnetic signals.

2. Description of the Prior Art

The United States has been a tempting terrorist target for decades. With the successful attack on the New York Trade Center in February 1993 there has been speculation by terrorism experts that attacks against the U.S. may increase. At the same time, a weapon is now available to subversive organizations against which there are few defenses. In fact, apart from the catastrophe itself, the weapon will leave no evidence of the attack.

Advanced electronic systems, such as aircraft control systems, are increasingly vulnerable to interference by electromagnetic radiation. Radio frequency (RF) power has been shown in many Department of Defense (DoD) and Department Of Energy (DOE) studies to be a threat to the proper operation of modem electronic systems. As circuits have become more densely packaged, more energy efficient and operate at higher speeds, they've experienced an associated increase in vulnerability and susceptibility to perturbations from non ionizing radiation.

This inherent vulnerability to RF power has spawned research internationally in optimizing transmitters for use as weapons. RF weapons have been developed by NATO and former Soviet nations. The effectiveness of many of these weapons is documented in studies sponsored by DoD and DOE organizations. Anecdotal data suggest RF weapons may have been deployed successfully in combat.

The effects of a successful RF weapon attack are unpredictable. The goal of RF weapons is merely to disrupt their victim system, with the specific result being of secondary importance. The end result varies widely depending on the victim system. In some cases, computers may be reset. In other cases, local oscillators may be driven off frequency, navigation systems misguided, safety sensors incorrectly set or reset, faulty data recorded or control systems given erroneous inputs. In the case of airliners, intended victim subsystems provide control of elevators, thrust reversals, etc.

The significance of the perturbation is proportional to the importance of the system corrupted. A portable compact disc player may react by garbling music or changing the track it is playing. Were a similar amount of energy directed at a commercial aircraft, the plane's control and navigation systems could be corrupted enough to cause a crash.

Another important similarity shared by vulnerable systems involves post-attack evidence. There typically is none. Although the perturbation of the victim system is indisputable while subjected to the RF field, the affected circuits rarely show damage. This makes identification of the cause extremely difficult. Failures appear to be anomalies with no traceable cause. One aspect of a successful RF weapon attack is that no evidence remains to incriminate the perpetrator.

The effects of even low level electric fields have long been recognized by the civil aviation community. Regulations prohibiting airline passengers from using radio receivers in flight are in response to the threat such systems pose to the plane's electronics systems. Superheterodyne receivers, such as those in commercial AM/FM radios, contain small local oscillators, which generate RF energy. Signals generated by the local oscillators are small. Signals escaping the radio as RF energy are unintentional and therefore likely to be smaller still. Even these small RF signals threaten the stability and reliability of the aircraft's electronics.

As aircraft become more advanced, their vulnerability increases. As the electronics become more integral with the actual control of the plane, the results can be more catastrophic. Boeing claims that the Boeing 757 can take off, fly to its destination and land itself without pilot intervention. Indeed, the plethora of gauges formerly found in the cockpit has been mostly replaced by a single screen. On-board computers decide what information the pilot needs to see displayed on the screen. Many of the moment to moment decisions made in flying a plane have been shifted to built-in electronics. Disrupting these systems can cause a plane to execute erroneous commands resulting in a crash.

As aircraft electronics systems are becoming more sensitive, the population of potential sources of interference is exploding. Portable Electronic Devices PEDs) commonly used in flight include laptop computers, hand held games, telephones, personal organizers, compact disc players, etc. Many of these PEDs emit RF energy. Instances of PEDs apparent interference with on board electronics systems have become increasingly common.

Similar to an RF weapon attack, no evidence of the disruption remains for analysis after the interfering signal stops. This has made locating failures difficult. Cockpit personnel have resorted to going through the cabin and asking individual passengers to turn off their PED. Correlating the aircraft's return to normal operation with which PED was disabled simultaneously has been the most powerful tool in identifying the source of the problem.

The population of cellular phone users is also exploding. Cellular phones are RF transmitters, and are prohibited from use in flight. According to Aviation Week & Space Technology, (Mar. 8, 1993 p 33): "Narratives from the incidents involving cellular phones show that the pilots noticed a clear cause and effect relationship between cellular/navigation interference and a cellular phone being illegally used in the cabin."

RF weapons are an ideal tool for terrorists. They present a combination of: (1) a proven vulnerability in one of terrorists' favorite targets—airliners; (2) the fact that ground based systems can allow a non-suicidal attack; and (3) the fact that the cause for the attack cannot be identified.

Announced restrictions of PEDs during approach and takeoff indicate and advertise when the aircraft is at greatest risk. Coincidentally, it also represents the terrorist's greatest opportunity. If on-board systems have been disrupted by PEDs inadvertently emitting fractions of watts, an attack focusing billions of watts on the plane may also disrupt the systems. During approach and takeoff, vulnerability is increased by low airspeed and altitude. Pilots have less time to react to system failures and few options to exercise. During this critical phase, the planes are over uncontrolled ground and at close range. This provides the terrorist access.

The lack of residual evidence is critically important to terrorists. It increases the probability of success for subsequent attacks, since potential targets will not be able to identify the risk against which they must protect themselves. At the same time, it decreases the probability of apprehension during any attack.

There are a number of weapons of mass destruction that terrorists would like to use, but are controlled by the sane powers in the world. This is generally done by tightly limiting access to critical technology or components. In some cases, the weapon system is too expensive or visible for a subversive organization to procure.

None of these safeguards are applicable to RF weapons. The technology was explored on both sides of the iron curtain under strict security for some time. In the past few years, however, the technology has moved into the physics labs of universities in the West. This provides a subversive organization with the opportunity to learn how to build such a system from scratch, using no controlled components or subsystems.

More recently, an even greater opportunity emerged. The former Soviet Union is selling most of its technology on the open market. In June 1993 a large sale in London reportedly featured many technologies that had been closely guarded secrets. A subversive may no longer need to learn how to build an RF weapon. Already tested RF weapons may be available for use. Scientists who developed the Soviet systems are also available, having lost their jobs with the collapse of their government. These experts represent a pool of highly skilled operators for RF weapons that have been acquired through the open market or left on battlefields.

On Mar. 3, 1991, United Airlines flight 585 crashed on approach to Colorado Springs. The National Transportation Safety Board (NTSB) has not been able to determine a cause for the crash. Their studies show the controls responding erratically and they are unable to reproduce the conditions of the crash in a simulator. Pilot autopsies and cockpit voice recordings indicate that the flight crew was competent and actively responding to the malfunctions. These are the exact indications an RF weapon attack might cause and the same residual evidence in the aftermath.

While UAL 585 may have crashed for reasons other than an RF weapon attack, it serves as an illustration of how such an attack would look. The flight crew had complete loss of control of the plane. Something besides pilot input caused the plane to bank sharply and crash in an almost directly nose-down attitude. Data show the plane pulled 4 g's in turning and was actually headed slightly in the opposite direction from its intended path when it crashed.

Detection of RF weapon emissions is difficult. The weapon is designed to produce the maximum amount of power possible, and to concentrate the power into the shortest possible pulse. Without information of when a pulse will occur or what the frequency it will be, most receivers cannot detect the use of such a weapon. Indeed, the weapon's probable effectiveness is inversely proportional to its probability of being detected by most receivers.

An effective detector must respond to short pulses individually. Pulses are likely to be much less than a microsecond in duration. Although the pulse width is likely to be short, the time between pulses can be expected to be long. Furthermore, one pulse may differ significantly from the next pulse. Each pulse must be considered a separate event for detection.

Defense studies have shown large scale "hardening" of electronic circuits against RF interference is difficult. Furthermore, a victim system's vulnerability is highly frequency dependent. Individual design and manufacturing details of the victim system inadvertently "tune" it to be sensitive to particular frequencies. Disrupting the victim system depends on locating and exploiting these vulnerable frequencies.

Generally, frequencies of vulnerability must be found experimentally. For the RF terrorist, this means a trial and error process of picking a frequency, attacking a plane and watching for an effect. During this experimentation phase, the terrorist has a low probability of success. However, without sensors deployed to detect his trials, he has even less probability of being discovered.

Once a frequency of vulnerability is identified, the probability of success for subsequent attacks increases dramatically. A goal of modern design and manufacturing processes is uniformity. Because a given model of aircraft has common design parameters, every aircraft of a given model has certain common vulnerabilities. Thus, before finding frequencies of vulnerability, the probability of success is relatively low. A quantum change in that probability occurs with the identification of the first such frequency. The terrorist's probability of apprehension is unaffected by the identification of such frequencies, however. The risk of being caught is solely dependent on the fielding of equipment that can detect his emissions.

The effects of on-board transmitters, such as cellular telephones, can have the same effect if the plane has systems sensitive to the transmitted frequency. The risk is mitigated somewhat by the relatively few frequencies that must be accounted for. It is amplified, however, by the size of the population owning cellular telephones and being tempted to use them during the most dangerous part of the flight, final approach. Making a "quick" phone call ahead to confirm hotels and ground transportation may seem innocent, but it has the potential to cause the flight crew to loose control at a critical part of the flight.

No device exists which generates an alarm upon receipt of a radio-frequency signal having an amplitude above a predetermined threshold and not matching any known signals of high amplitude.

SUMMARY OF THE INVENTION

The disadvantages of the prior art are overcome by the present invention which is an apparatus for detecting abnormal radio-frequency signals. The apparatus includes an antenna responsive to a radio-frequency signal. The radio frequency signal comprises a plurality of signal components, each of which has an associated amplitude. A circuit attenuates each of the plurality of signal components having an amplitude not greater than a threshold value and generates a suspect signal comprising each of the plurality of signal components having an amplitude greater than the threshold value. A circuit then compares the suspect signal to a plurality of preselected signal types. When the suspect signal does not correspond to any of the preselected signal types, a circuit generates an alarm.

Another aspect of the invention is an apparatus for detecting usage of a radio-frequency weapon. The apparatus includes an element capable of receiving a signal having an amplitude, wherein the signal comprises a plurality of signal components. A circuit determines a background signal amplitude of the plurality of signal components. A filtering circuit generates a filtered signal corresponding only to signal components of the plurality of signal components having amplitudes greater than a preselected margin above the amplitude of the background signal. A circuit then compares the filtered signal to a plurality of known signals. An alarm is generated when the filtered signal does not correspond to any of the plurality of known signals.

Another aspect of the invention is an apparatus for detecting use of a radio-frequency weapon, comprising an antenna responsive to a radio-frequency signal, the radio frequency signal comprising a plurality of signal components, each of which has an associated amplitude. A circuit generates a digital representation of the amplitude of the radio-frequency signal. A digital computer is programmed to periodically sample and record the digital representation of the amplitude of the first signal during a preselected number of sampling episodes, thereby generating a plurality of recorded amplitudes. The digital computer then generates a sum of each of the plurality of recorded amplitudes. The computer then generates a quotient of the sum divided by the preselected number and generates a time-averaged amplitude signal representative of the quotient. A circuit generates a threshold signal so that the threshold signal has an amplitude equal to the time average amplitude of the radio-frequency signal plus a preselected offset amplitude. A circuit that is responsive to the threshold signal, attenuates each of the plurality of signal components having an amplitude not greater than the amplitude of the threshold signal and generates a suspect signal comprising any of the plurality of signal components having an amplitude greater than the amplitude of the threshold signal. A circuit then generates a digital signal representation of the suspect signal. A circuit compares the digital representation of the suspect signal to a plurality of digital signal representations of preselected signal types. When the digital signal representation of the suspect signal does not correspond to any of the digital signal representations of the preselected signal types an alarm circuit generates an alarm. A circuit generates a false-alarm indicator when the suspect signal corresponds to at least one of the digital signal representations of the preselected signal types.

Yet another aspect of the invention is a method of detecting usage of a radio-frequency weapon. A signal, having an amplitude and comprising a plurality of signal components is received. A background signal amplitude of the plurality of signal components is determined. The signal is filtered to generate a filtered signal corresponding only to signal components of the plurality of signal components having amplitudes greater than a preselected margin greater than the amplitude of the background signal. The filtered signal is compared to a plurality of known signals. When the filtered signal does not correspond to any of the plurality of known signals, an alarm is generated.

These and other aspects of the invention will become apparent from the following description of the preferred embodiment taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
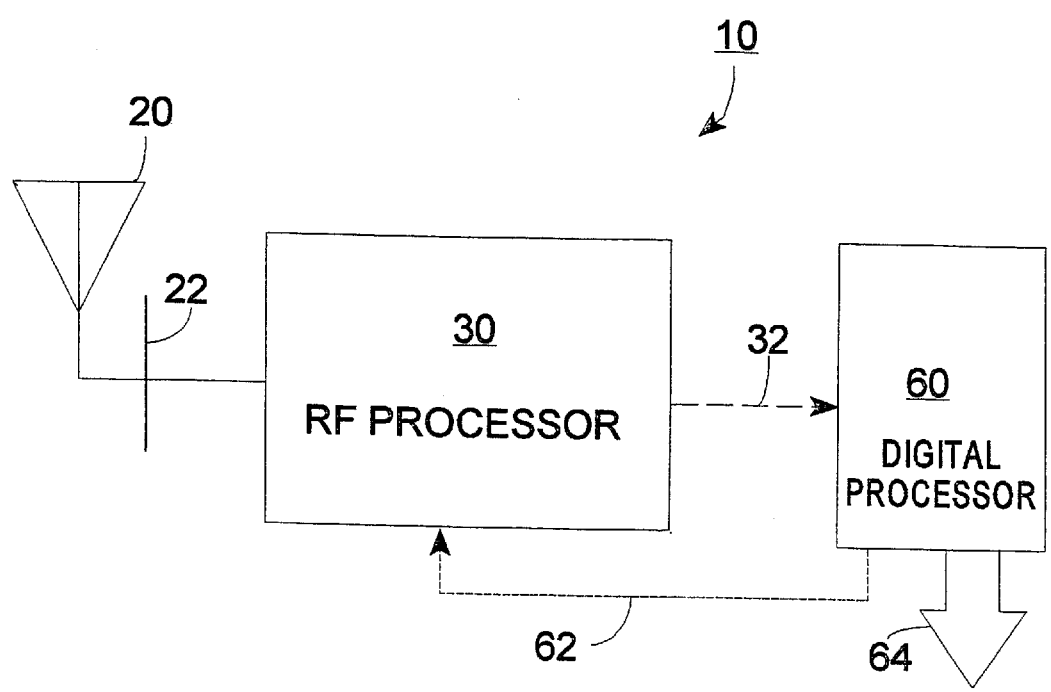
FIG. 1 is a schematic diagram of one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: "a," "an," and "the" includes plural reference, "in" includes "in" and "on."

In one embodiment, the invention is employed on the platform against which the weapon is used. Thus, the signals from an RF weapon will be much larger than those emanating from legitimate RF sources.

As shown in FIG. 1, one embodiment of the invention is an apparatus 10 for detecting abnormal radio-frequency signals, such as those from radio-frequency weapons. Radio-frequency signals are received by an antenna 20 mounted outside of a pressure bulkhead 22 of an aircraft, or other vehicle. In one embodiment, the antenna 20 is an interior wing-mounted spiral antenna. One suitable antenna 20 is an AEL ASO-1658A cavity backed spiral antenna. The antenna 20 is responsive to a radio-frequency signal, which comprises a plurality of signal components, each having an associated amplitude. Signals received by the antenna 20 are processed by a radio-frequency signal processor 30 (RF processor).

The RF signal processor 30 attenuates each of the plurality of signal components having an amplitude not greater than a threshold value. The radio-frequency processor also generates a suspect signal comprising each of the plurality of signal components having an amplitude greater than the threshold value. A digital signal processor 60 receives suspect signal footprint data 32 (in a digital format) from the RF signal processor 30. The digital signal processor 60 compares the suspect signal to a plurality of preselected signal types and generates an alarm signal 64 when the suspect signal does not correspond to any of the preselected signal types. A control signal 62 from the digital signal processor 60 indicates to the RF processor 30 the threshold value.

Figure 2:
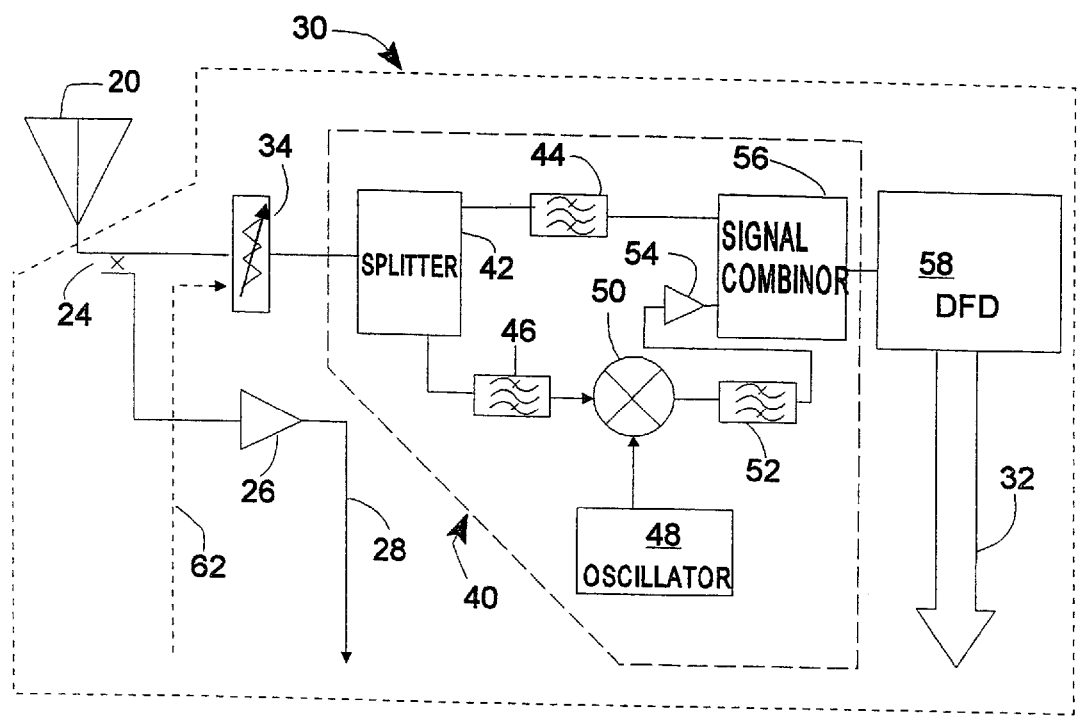
FIG. 2 is a schematic diagram of a radio-frequency processor used in the embodiment of FIG. 1.

As shown in FIG. 2, the RF processor 30 receives input from the antenna 20. The RF processor 30 must be able to measure the peak amplitude of received signals and determine the predominant frequency of the largest received signal. As the electromagnetic environment changes, the dynamic range of the RF processor 30 must be automatically adjusted to ensure rapid response to an RF weapon emission while retaining a low false alarm rate.

Signals received by the antenna 20 are sampled through a directional coupler 24. One signal from the directional coupler 24 is detected using a successive detector log video amplifier 26 (SDLVA). The SDLVA 26 provides a voltage output that is the logarithmically compressed representation of the signal level of the RF energy received by the antenna 20. Unlike other log video amps, the SDLVA 26 has a rapid response and recovery time which is critical to capturing short pulses typical of RF weapons.

The SDLVA 26 is an improvement on a detector logarithmic video amplifier (DLVA), which is also referred to simply as a log amp. A log amp compresses a broad dynamic range into a narrow output. For example, while a standard linear amplifier may have a dynamic range of 30 dB, it is not unusual for a log amp to have a dynamic range on the order of 80 dB or more. This broad dynamic range is important for RF weapons detectors because the level of the received signal could have a frequency over a broad range. Log amps achieve their dynamic range at the price of rise and fall times. A 100 nanosecond pulse introduced to a log amp may result in an output waveform that is well over a microsecond. This slow response time is unacceptable for an RF weapon detector, since a primary false alarm discriminant is pulse width. The SDLVA 26, on the other hand, has multiple amplifiers in a single package, wherein each amplifier is responsible for only 10–15 dB of gain and can therefore respond and recover quickly. The output of all of the individual amplifiers is then summed into a final output waveform. Thus, the SDLVA 26 retains the broad dynamic range of a log amp while retaining the fast performance of a linear amplifier. In one embodiment, a DLVA, such as an American Microwave LVD-0518-50, may be suitable in place of an SDLVA 26.

The SDLVA 26 produces a log video output signal 28 that is used by the digital processor 60 to obtain the control signal 62 used by the RF processor 30. The control signal 62 is received by a programmable attenuator 34, which acts similarly to a "squelch" in a radio. One suitable such attenuator 34 is an K8496H dc-18 GHz attenuator. The programmable attenuator 34 is ordinarily set well above the background electromagnetic level, so that only signals of unusually large amplitude will pass through to the rest of the RF Processor 30.

Signals of amplitude sufficient to pass through the programmable attenuator 34 are introduced to a frequency transforming circuit 40. Signals from the frequency transforming circuit 40 are passed to a Digital Frequency Discriminator 58 (DFD) that measures the frequency of the transformed signal.

The frequency transforming circuit 40 comprises a two way splitter 42, with equal power going to two separate signal paths 42a, 42b. These two paths are a direct path 42a and a heterodyne path 42b. The direct path 42a feeds into a filter 44 (such as one available from K&L Microwave) that allows only frequencies in the range of 2 GHz to 16.5 GHz to pass, while the heterodyne path 42b feeds into a filter 46 that allows only frequencies in the range of 0.5 GHz to 2.0 GHz to pass.

Because the DFD 58 operates from 2–18 GHz, a signal transforming circuit 40 transforms the lower part of the spectrum of interest into the upper part of the operational spectrum of the DFD 58. A signal mixer 50 (such as a WJM87C) receives a signal from filter 46 and converts the relatively low-frequency signal using input from a constant 18.5 GHz local oscillator 48 (such as a ST Microwave DRO). The 0.5–2 GHz signal is converted using the equation:

$$F_{IF} = F_{LO} - F_{RF}$$

Where:

$F_{IF}$=Intermediate Frequency (IF) (16.5–18 GHz);

$F_{LO}$=Local Oscillator Frequency (18.5 GHz); and $F_{RF}$=RF Frequency (0.5–2 GHz).

A filter 52 eliminates any unwanted frequencies produced by the conversion process. An amplifier 54, having a gain equal to the combined losses of filter 46, mixer 50 and filter 52 tunes the net loss of the heterodyne path 42b to that of the direct path 42a.

The direct path 42a and the heterodyne path 42b are recombined by a signal combiner 56, resulting in a continuous spectrum from 2–18 GHz. This is the same operating spectrum as commonly available DFDs. The DFD 58 receives RF energy from the combiner 56 through a coaxial cable and outputs a digital word that identifies the RF energy's primary frequency. This is done through a series of delay lines and phase detectors inside the DFD 58.

The accuracy of the DFD 58 signal footprint data 32 depends on how many bits the DFD 58 provides. This, in turn, depends on the quantity of delay lines and phase detectors used in the DFD 58. The DFD 58 measures the frequency of the signal of greatest amplitude. The frequency resolution will be within 5 MHz. A 12 bit digital word representing the frequency will be sent from the DFD 58 to the digital processor 60 for further manipulation and comparison.

The ability to measure only the signal of greatest amplitude while ignoring the rest of the RF signals in the environment is important. The portion of the flight where an RF weapon is of greatest threat is also when the RF environment is likely to be the most complex. The sensor must not be distracted by the numerous legitimate RF energy sources in that environment. Generally, as long as there is an amplitude difference of 10 dB between the largest signal and the next largest, only the signal of interest will be measured by the DPD 58. For a signal to be considered a threat, it's amplitude will exceed all legitimate source amplitudes by several times that amount.

Figure 3:
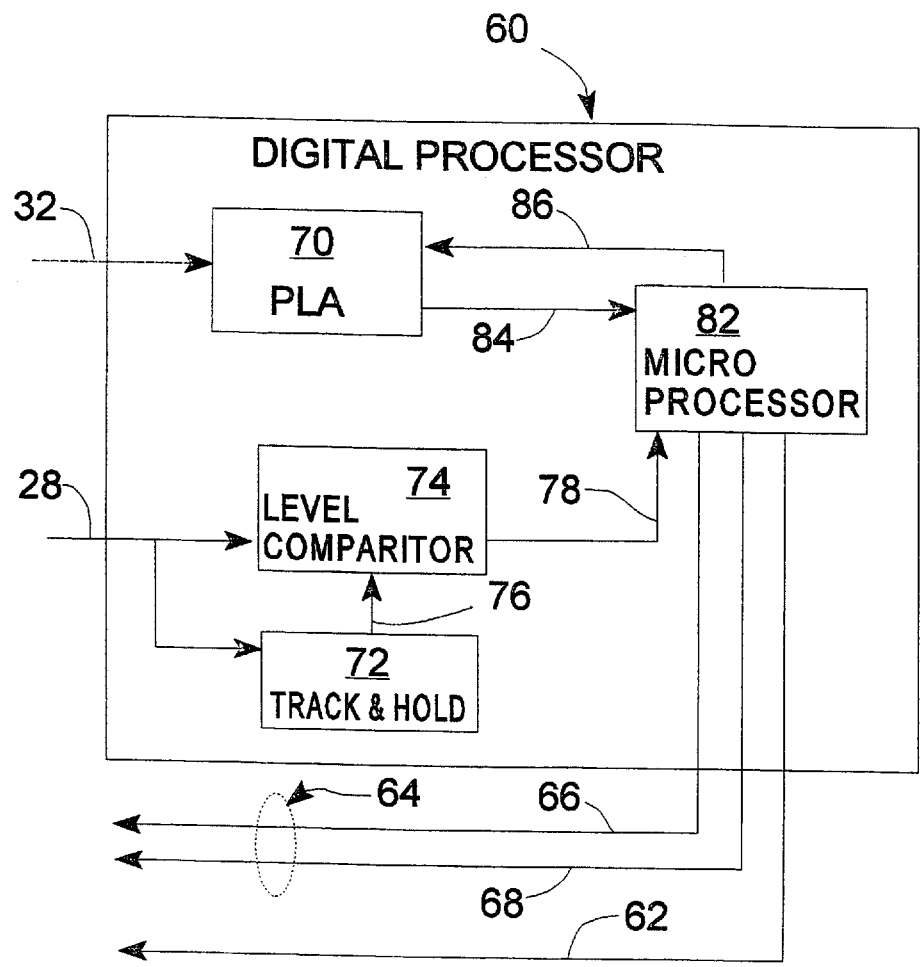
FIG. 3 is a schematic diagram of a digital processor used in the embodiment of FIG. 1.

As shown in FIG. 3, the digital processor 60 receives a log video signal 28 and suspect signal footprint data 32 from the RF processor 30 and generates the attenuator control signal 62 and two output signals 64, which include an attack warning signal 66 and a false alarm signal 68. The log video signal 28 is used to generate an attenuator control signal 62 that sets the programmable attenuator 34. The suspect signal footprint data 32 is a digital signal representation of the suspect signal that is compared to a plurality of digital representations of the preselected signal types.

The log video signal 28 comes from the SDLVA 24, which is not subject to the affects of the programmable attenuator 34 in the RF Processor 30. Therefore, the log video signal 28 will always have a signal present. The digital processor 60, using a level comparator 74 and a track and hold circuit 72 that generates a reference voltage signal 76 used by the level comparator 74, samples the log video signal 28 over a preselected period. The level comparator 74 generates a time-averaged amplitude signal 78 that represents a time averaged amplitude of the RF signal. A microprocessor 82 generates the attenuator control signal 62, corresponding to a the threshold value for the attenuator 34, so that the threshold value equals the time average amplitude of the RF signal plus a preselected offset amplitude. In one embodiment, the sample period is on the order of a few minutes. At the end of the sample period, the digital processor 60 calculates the average background electromagnetic emission level. This level is used to calculate the appropriate amount of attenuation to be introduced to the programmable attenuator 34. Typically, the attenuator will be set 10–20 dB above the largest anticipated signal.

Under normal circumstances, the DFD 58 will have no output. When a received signal is large enough to exceed the threshold set by the programmable attenuator 34, the DFD 58 will measure its frequency. The resulting digital word will be received by the digital processor 60. A look up table containing signal footprints of known emitters is programmed into a programmable logic array 70 (PLA).

A microprocessor 82 compares the footprints from the PLA 70 to the suspect signal footprint data 32 from the DFD 58. In one embodiment, both frequency and pulse width comparisons are made. If no match occurs in either comparison—indicating that the suspect signal is unknown—then an attack alarm signal 66 is generated. The output signals 64 are relayed to the operator via light emitting diodes, audible alarms, or any suitable alarm devices. In alternative embodiments, the outputs 64 may be provided to a flight data recorder (not shown), a pilot notification system or an automatic ground control notification system.

Periodically, the digital processor 60 performs a self test by reducing the level of attenuation until the DFD 58 is excited. The resulting suspect signal footprint data 32 is compared against signal footprints anticipated from known radars, or other known sources. When the match is made successfully, the false alarm signal 68 is generated to alert the user that only a test has taken place. This test can also be initiated by a user command.

In one embodiment, the microprocessor 82 is programmed to perform the following steps: 1.) periodically sample and record the digital representation of the amplitude of the radio-frequency signal during a preselected number of sampling episodes, thereby generating a plurality of recorded amplitudes; 2.) generate a sum of each of the plurality of recorded amplitudes; 3.) generate a quotient of the sum divided by the preselected number; and 4.) generate a time-averaged amplitude signal representative of the quotient.

Figure 4:
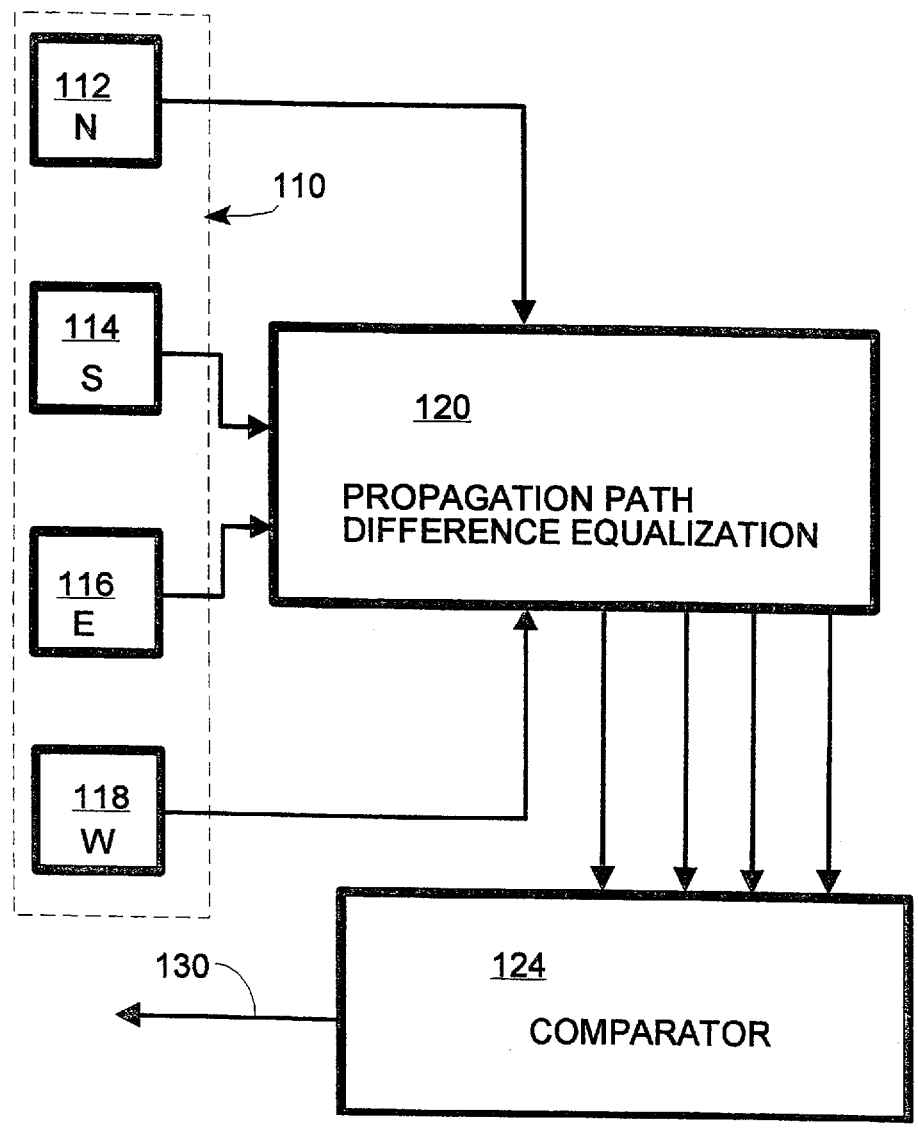
FIG. 4 is a schematic diagram of an embodiment of the invention used to locate an RF weapon.
Figure 5:
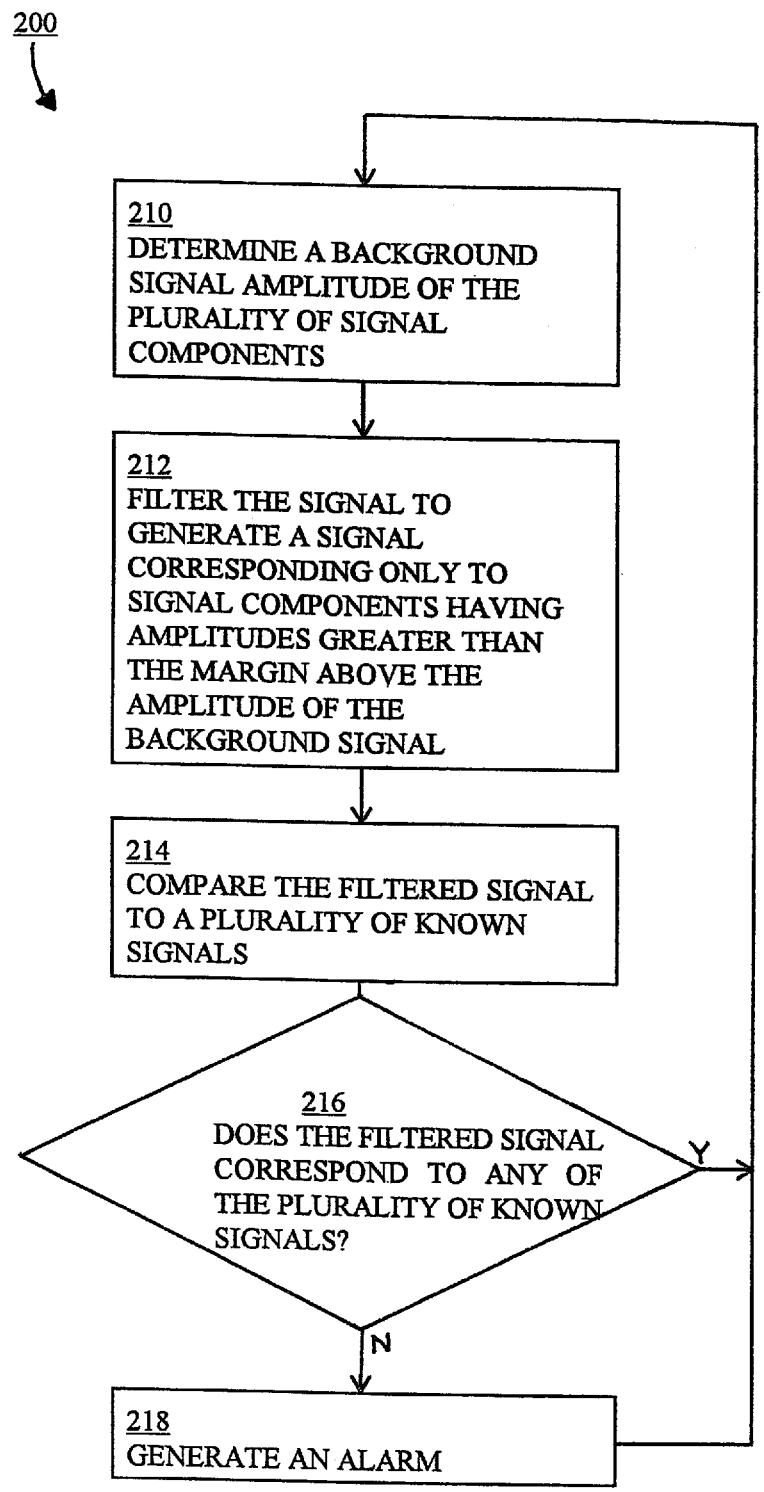
FIG. 5 is a flow chart depicting one embodiment of the method of the invention.

As shown in FIG. 4, the invention may be embodied in a ground-based RF weapon sensor 100. Such a sensor would be used to triangulate on RF weapon usage. Such a sensor 100 comprises a plurality of spaced-apart signal receiving devices 110, such as antennae. The plurality of signal receiving devices 110 could include a northerly-oriented device 112, a southerly-oriented device 114, an easterly-oriented device 116, and a westerly-oriented device 118. The signal receiving devices 110 input signal information to a propagation path difference equalization circuit 120, which outputs data to a time of arrival comparison circuit 124. The comparison circuit 124, in turn generates a signal output 130 indicating an angle of arrival data product to an output device (not shown). receiving a signal, having an amplitude, wherein the signal comprises a plurality of signal components;

As shown in FIG. 5, the method 200 of the invention involves the step 210 of determining a background signal amplitude of the plurality of signal components. The signal is filtered 212 to generate a filtered signal corresponding only to signal components of the plurality of signal components having amplitudes greater than a preselected margin greater than the amplitude of the background signal. The filtered signal is compared 214 to a plurality of known signals. A test 216 is performed to determine if the filtered signal has a match in the plurality of known signals. When the filtered signal does not correspond to any of the plurality of known signals, an alarm is generated 218.

The invention may also be embodied in a PED sensor (not shown). In the PED sensor, the invention is modified to detect the generation of unintentional emissions from PEDs or unauthorized emissions from passenger's on-board communications equipment. Each platform would use its own such detector, which would be installed inside the cabin and would monitor the electromagnetic environment for signals that are potentially disruptive to aircraft operations. When unintentional PED emissions (computers, games, etc.) are detected by this embodiment, the flight crew will be notified. If the platform is above 10,000 ft, this notification may be automatically disabled, since most airlines allow the operation of PEDs at these altitudes.

The FCC has prohibited operation of cellular telephones in flight. The use of a cellular phone not only represents a threat to the aircraft, but consistently perturbs terrestrial communications below. Unlike operation of computers and electronic games, the user is committing a crime and needs to be identified and/or made to cease operation. Anytime a cellular phone transmits, it sends information that unambiguously identifies itself and the registered user. This occurs under three conditions. The phone transmits when it is turned on as part of the initialization process, when it is used to place or answer a call and periodically to inform the local microwave network of its presence and availability. The first and last of these conditions is transparent to the user and many cellular phone owners are unaware of these transmissions.

One embodiment of the PED sensor captures cellular transmissions whose amplitude indicates the phone is on board. This process will begin when passengers begin boarding the platform, continue until everyone has deplaned, then begin again. Any cellular phones that signal their presence, will have their number recorded. The owner can be immediately instructed to disable the phone by turning it off. This process will be most active during boarding and taxiing phases of the flight. If, in later phases of the flight, a passenger turns his cellular phone on, its number will be immediately detected. The operator can again be instructed to disable the phone before making a call. Anyone disregarding these instructions will have the parameters of their phone call recorded. Law enforcement officials can then prosecute the violations under the Federal Communications Commission regulations prohibiting in flight cellular use.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for detecting radio-frequency signals of the type used as weapons for damaging electronic components, comprising:

a. an antenna responsive to a radio-frequency signal, the radio frequency signal comprising a plurality of signal components, each of which has an associated amplitude;

b. means for generating an attenuation signal having an amplitude equal to a time-averaged amplitude of the plurality of signal components:

c. means for attenuating each of the plurality of signal components having an amplitude not greater than a threshold value and for generating a suspect signal comprising each of the plurality of signal components having an amplitude greater than the threshold value;

d. means for comparing the suspect signal to a plurality of preselected signal types; and e. means for generating an alarm when the suspect signal does not correspond to any of the preselected signal types.

2. The apparatus of claim 1, further comprising means for generating a digital signal representation of the suspect signal, wherein the comparing means compares the digital signal representation of the suspect signal to a plurality of digital representations of the preselected signal types.

3. The apparatus of claim 1, wherein the attenuating means comprises:

a. means for generating a time-averaged amplitude signal representative of a time averaged amplitude of the radio-frequency signal; and b. means for generating the threshold value so that the threshold value equals the time average amplitude of the radio-frequency signal plus a preselected offset amplitude.

4. The apparatus of claim 3, wherein the time-averaged amplitude signal generating means comprises:

a. means for generating a digital representation of the amplitude of the radio-frequency signal; and
b. a digital processor programmed to:
  i. periodically sample and record the digital representation of the amplitude of the radio-frequency signal during a preselected number of sampling episodes, thereby generating a plurality of recorded amplitudes;
  ii. generate a sum of each of the plurality of recorded amplitudes;
  iii. generate a quotient of the sum divided by the preselected number; and
  iv. generate a time-averaged amplitude signal representative of the quotient.

5. The apparatus of claim 3, wherein the threshold value generating means further comprises means for generating a threshold signal representative of the threshold value and wherein the attenuating means is responsive to the threshold signal.

6. The apparatus of claim 3, wherein the preselected offset amplitude is at least 10 dB.

7. The apparatus of claim 1, wherein the alarm generating means comprises a light.

8. The apparatus of claim 1, wherein the alarm generating means comprises an audible alarm.

9. The apparatus of claim 1, further comprising means for generating a false-alarm indicator when the suspect signal corresponds to at least one of the digital signal representations of the preselected signal types.

10. The apparatus of claim 1, adapted for use in an aircraft wherein the receiving means comprises a spiral antenna mounted on a wing.

11. An apparatus for detecting usage of a radio-frequency weapon, comprising:
  a. means for receiving a signal having an amplitude, wherein the signal comprises a plurality of signal components;
  b. means for determining a background signal amplitude of the plurality of signal components;
  c. means for filtering the signal to generate a filtered signal corresponding only to signal components of the plurality of signal components having amplitudes greater than a preselected margin above the amplitude of the background signal;
  d. means for comparing the filtered signal to a plurality of known signals; and
  e. means for generating an alarm when the filtered signal does not correspond to any of the plurality of known signals.

12. The apparatus of claim 11 wherein the receiving means comprises a spiral antenna.

13. The apparatus of claim 11 wherein the determining means comprises means for calculating a time-averaged amplitude of the plurality of signal components.

14. An apparatus for detecting use of a radio-frequency weapon, comprising:
  a. an antenna responsive to a radio-frequency signal, the radio frequency signal comprising a plurality of signal components, each of which has an associated amplitude;
  b. means for generating a digital representation of the amplitude of the radio-frequency signal;
  c. a digital computer programmed to:
    i. periodically sample and record the digital representation of the amplitude of the first signal during a preselected number of sampling episodes, thereby generating a plurality of recorded amplitudes;
    ii. generate a sum of each of the plurality of recorded amplitudes;
    iii. generate a quotient of the sum divided by the preselected number; and
    iv. generate a time-averaged amplitude signal representative of the quotient;
  d. means for generating a threshold signal so that the threshold signal has an amplitude equal to the time average amplitude of the radio-frequency signal plus a preselected offset amplitude;
  e. means, responsive to the threshold signal, for attenuating each of the plurality of signal components having an amplitude not greater than the amplitude of the threshold signal and for generating a suspect signal comprising any of the plurality of signal components having an amplitude greater than the amplitude of the threshold signal;
  f. means for generating a digital signal representation of the suspect signal;
  g. means for comparing the digital representation of the suspect signal to a plurality of digital signal representations of preselected signal types;
  h. means for generating an alarm when the digital signal representation of the suspect signal does not correspond to any of the digital signal representations of the preselected signal types; and
  i. means for generating a false-alarm indicator when the suspect signal corresponds to at least one of the digital signal representations of the preselected signal types.

15. The apparatus of claim 14 wherein the preselected offset amplitude is at least 10 dB.

16. The apparatus of claim 14 wherein the alarm generating means comprises a light.

17. The apparatus of claim 14 wherein the alarm generating means comprises an audible alarm.

18. A method of detecting usage of a radio-frequency weapon, comprising:
  a. receiving a signal, having an amplitude, wherein the signal comprises a plurality of signal components;
  b. determining a background signal amplitude of the plurality of signal components;
  c. filtering the signal to generate a filtered signal corresponding only to signal components of the plurality of signal components having amplitudes greater than a preselected margin greater than the amplitude of the background signal;
  d. comparing the filtered signal to a plurality of known signals; and
  e. generating an alarm when the filtered signal does not correspond to any of the plurality of known signals.

* * * * *